(12) United States Patent
Kim

(10) Patent No.: US 8,421,980 B2
(45) Date of Patent: Apr. 16, 2013

(54) LIQUID CRYSTAL DISPLAY DEVICE

(75) Inventor: Eun Hong Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 554 days.

(21) Appl. No.: 11/768,121

(22) Filed: Jun. 25, 2007

(65) Prior Publication Data

US 2008/0013029 A1     Jan. 17, 2008

(30) Foreign Application Priority Data

Jun. 29, 2006 (KR) .................. 10-2006-0059691

(51) Int. Cl.
*G02F 1/1345* (2006.01)
(52) U.S. Cl.
USPC ........................................ 349/152
(58) Field of Classification Search .......... 349/148, 349/149–152
See application file for complete search history.

(56) References Cited

U.S. PATENT DOCUMENTS

| | | | |
|---|---|---|---|
| 6,052,169 A * | 4/2000 | Kim | 349/148 |
| 6,104,465 A | 8/2000 | Na et al. | |
| 6,380,918 B1 * | 4/2002 | Chiba et al. | 345/90 |
| 2003/0146990 A1 * | 8/2003 | Tsukamoto et al. | 348/294 |
| 2003/0197826 A1 * | 10/2003 | Yun et al. | 349/149 |
| 2005/0024307 A1 * | 2/2005 | Kwok et al. | 345/87 |
| 2005/0237468 A1 * | 10/2005 | Kim | 349/149 |
| 2006/0256272 A1 * | 11/2006 | Liou et al. | 349/149 |
| 2007/0132932 A1 * | 6/2007 | Park | 349/149 |

FOREIGN PATENT DOCUMENTS

| | | |
|---|---|---|
| JP | 2001-228805 A | 8/2001 |
| KR | 10-0237679 B1 | 1/2000 |

* cited by examiner

*Primary Examiner* — Richard Kim
*Assistant Examiner* — Michael Inadomi
(74) *Attorney, Agent, or Firm* — Birch, Stewart, Kolasch & Birch, LLP

(57) ABSTRACT

A liquid crystal display device includes a liquid crystal panel including a display unit in which pixels are provided in the form of a matrix and a plurality of pad units provided at a peripheral portion in at least one side of the display unit and including a plurality of connection pads having widths different from each other, and a tape carrier package including a plurality of output pads corresponding to the plurality of pad units, in which driving integrated circuits are mounted on the output pads to drive the liquid crystal panel, and the output pads have widths different from each other corresponding to the plurality of connection pads.

2 Claims, 3 Drawing Sheets

A/A

LIQUID CRYSTAL DISPLAY DEVICE

The present application claims priority under 35 U.S.C. 119 and 35 U.S.C. 365 to Korean Patent Application No. 10-2006-0059691 (filed on Jun. 29, 2006), which is hereby incorporated by reference in its entirety.

BACKGROUND OF INVENTION

1. Field of Invention

The present invention relates to a liquid crystal panel, and more particularly, to a liquid crystal panel capable of minimizing resistance difference between link lines and a liquid crystal display device having the same.

2. Description of Related Art

As the information-oriented society has developed, there are various demands for display apparatuses. To satisfy the demands, various flat display devices such as a liquid crystal display device (LCD, hereinafter referred to as 'LCD'), a plasma display panel (PDP), and electro-luminescent display (ELD), and the like are developed and some of them have already been utilized as a display device in various equipments.

The liquid crystal display device is configured such that a data printed circuit board (PCB) for applying a data signal and a gate printed circuit board for applying a driving signal are coupled with a liquid crystal panel, in which an array substrate and a color filter substrate are bonded to each other, by means of a gate tape carrier package (TCP) and a data tape carrier package (TCP).

FIG. 1 is a plan view schematically illustrating a related liquid crystal display device.

As illustrated in FIG. 1, the related liquid crystal display device includes a liquid crystal panel 2, in which an array substrate having a plurality of gate lines and data lines intersecting each other is coupled with a color filter substrate having red, green and blue color filter layers by interposing a liquid crystal layer therebetween, and a gate (or scan) printed circuit board 22 (PCB) attached to a left side (or right side) of the liquid crystal panel 2 by interposing a gate (or scan) TCP 20 therebetween.

Moreover, a data (or source) printed circuit board (PCB) 32 is attached to the upper side (or the lower side) of the liquid crystal panel 2 by interposing the data (or source) TCP 30 therebetween.

The gate TCP 20 and the data TCP 30 electrically connect the gate PCB 22, the data PCB 32, and the liquid crystal panel 2 to each other to supply a signal supplied from the gate PCB 22 and the data PCB 32 to the liquid crystal panel 2.

The driving signal processed by the gate PCB 22 is supplied to the gate lines arranged in the liquid crystal panel 2 through the gate TCP 20, and similarly, a data signal processed by the data PCB 32 is supplied to the data lines arranged in the liquid crystal panel 2 through the data TCP 30.

A gate driver IC 21 is mounted on the gate TCP 20, and the gate driver IC 21 adjusts the driving signal supplied from the gate PCB 22 through a predetermined scheme to provide the adjusted driving signal to the gate lines arranged in the liquid crystal panel 2.

A data driver IC 31 is mounted on the data TCP 30, and the data driver IC 31 processes the data signal supplied from the data PCB 32 through a predetermined scheme to provide the processed driving signal to the date lines arranged in the liquid crystal panel 2.

FIG. 2 is a view illustrating a portion A shown in FIG. 1 in detail.

As illustrated in FIGS. 1 and 2, the data TCP 30 is provided with a plurality of output pads 25, in which the output pads 25 are connected to the data lines arranged in a display area B of the liquid crystal panel 2 by a plurality of link lines 35 corresponding to the output pads 25 one by one. In this case, the link lines 35 are formed in a non-display area A of the liquid crystal panel 2. In more detail, the output pads 25 are formed in a pad region C on the non-display area B of the liquid crystal panel 2, and the plurality of link lines 35 are formed on a link region D of the non-display area A of the liquid crystal panel 2.

The plurality of output pads 25 provided in the data TCP 30 are classified into first to third output pads 25a to 25c according to regions where the output pads 25 are located in the data TCP 30.

The second region of the data TCP 30, as illustrated in FIG. 2, indicates the central region among the regions where the output pads 25 are located in the data TCP 30. The first and third regions of the data TCP 30, as illustrated in FIG. 2, indicate the outer regions among the regions where the output pads 25 are located in the data TCP 30. More precisely, the first region is a left-side (or right-side) region to the second region and the third region is a right-side (or left-side) region to the second region. An output pad 25 located in the first region among the output pads 25 is referred to as a first output pad 25a, an output pad 25 located in the second region among the output pads 25 is referred to as a second output pad 25b, and an output pad 25 located in the third region in the data TCP 30 among the output pads 25 is referred to as a third output pad 25c.

Similar to the plurality of output pads 25, from among the plurality of link lines 35, a link line electrically connected to the first output pact 25a is referred to as a first link line 35a, a link line electrically connected to the second output pad 25b is referred to as a second link line 35b, and a link line electrically connected to the third output pad 25c is referred to as a third link line 35c.

In other words, the first link line 35a is electrically connected to the first output pad 25a, the second link line 351: is electrically connected to the second output pad 25b, and the third link line 35c is electrically connected to the third output pad 25c.

Due to the region where the first to third output pads 25a to 25c are positioned, the length of the first link line 35a electrically connected to the first output pad 25a and the length of the third link line 35c electrically connected to the third output pad are longer than that of the second link line 35b electrically connected to the second output pad 25b formed in the second region.

Since the length of the first and third link lines 35a and 35c is longer than that of the second link line 35b, line resistance of the first and third link lines 35a and 35c is greater than that of the second link line 35b. For this reason, a resistance difference occurs among the first to third link lines 35a to 35c connected to the first to third output pads 25a to 25c, respectively. Due to the resistance difference between the first to third link lines 35a to 35c, the data signals supplied to the data lines corresponding to the first to third link lines 35a to 35c are distorted, so a problem such as degradation of image quality may occur.

In order to compensate for the resistance difference between the first to third link lines 35a to 35c, a process of forming a pattern to compensate for the resistance difference must be performed relative to the second link line 35b, causing increase of manufacturing costs.

SUMMARY OF THE INVENTION

Accordingly, the present invention is directed to a liquid crystal display device that substantially obviates one or more of the problems due to limitations and disadvantages of the related art.

It is an aspect of the present invention to provide a liquid crystal panel capable of minimizing a resistance difference between link lines and a liquid crystal display device having the same.

It is another aspect of the present invention to provide a liquid crystal panel for improving an image quality and a liquid crystal display device having the same.

In one aspect, the present invention provides a liquid crystal panel comprising a display unit in which pixels are provided in the form of a matrix, a plurality of pad units provided at a peripheral portion in at least one side of the display unit and including a plurality of connection pads having widths different from each other, and a plurality of link units corresponding to the pad units and including a plurality of link lines having widths different from each other to connect the plurality of connection pads to the display unit.

In another aspect, the present invention provides a liquid crystal display device comprising a liquid crystal panel including a display unit, in which pixels are provided in the form of a matrix, and a plurality of pad units provided at a peripheral portion in at least one side of the display unit and including a plurality of connection pads having widths different from each other, and a tape carrier package including a plurality of output pads corresponding to the plurality of pad units, in which driving integrated circuits are mounted on the output pads to drive the liquid crystal panel and the output pads have widths different from each other corresponding to the connection pad.

In still another aspect, the present invention provides a liquid crystal display device comprising a liquid crystal panel including a display unit in which pixels are provided in a form of a matrix, a plurality of pad units provided at a peripheral portion in at least one side of the display unit and including, a plurality of connection pads having widths different from each other, and a plurality of link units corresponding to the pad units and including a plurality of link lines having widths different from each other to connect the plurality of connection pads to the display unit, and a tape carrier package including a plurality of output pads corresponding to the plurality of pad units, in which driving integrated circuits are mounted on the output pads to drive the liquid crystal panel, and the output pads have widths different from each other corresponding to the plurality of connection pads.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF EMBODIMENTS ACCORDING TO THE INVENTION

Hereinafter, embodiments of the present invention will be described in detail with reference to the accompanying drawings.

Figure 1:
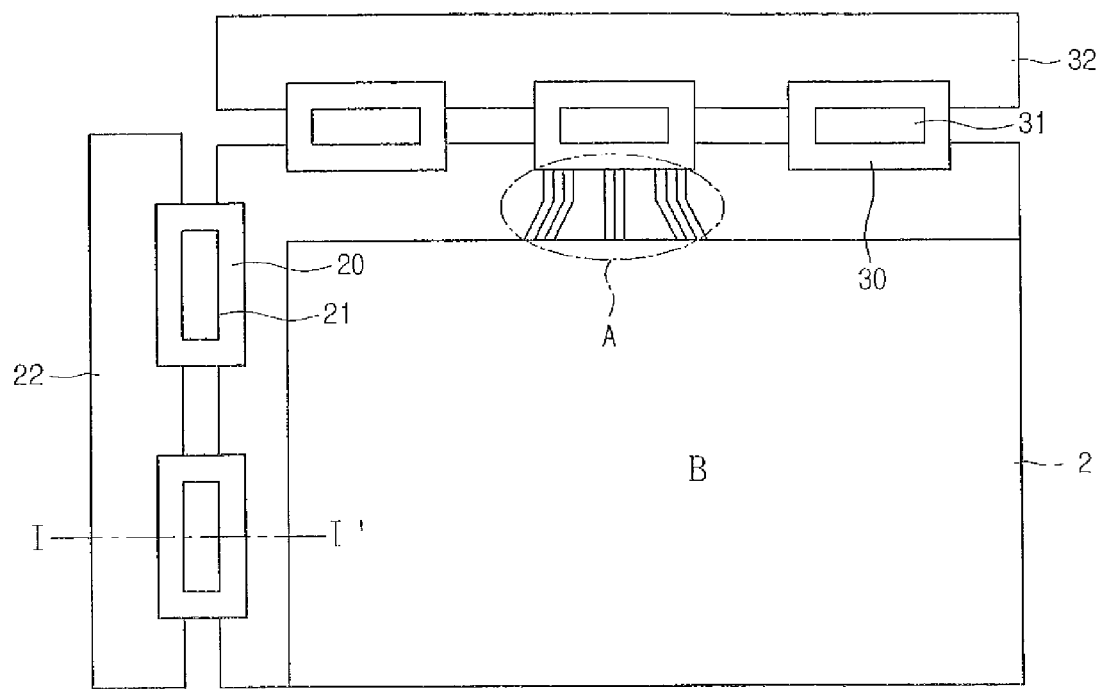
FIG. 1 is a plan view schematically illustrating a related liquid crystal display device.
Figure 2:
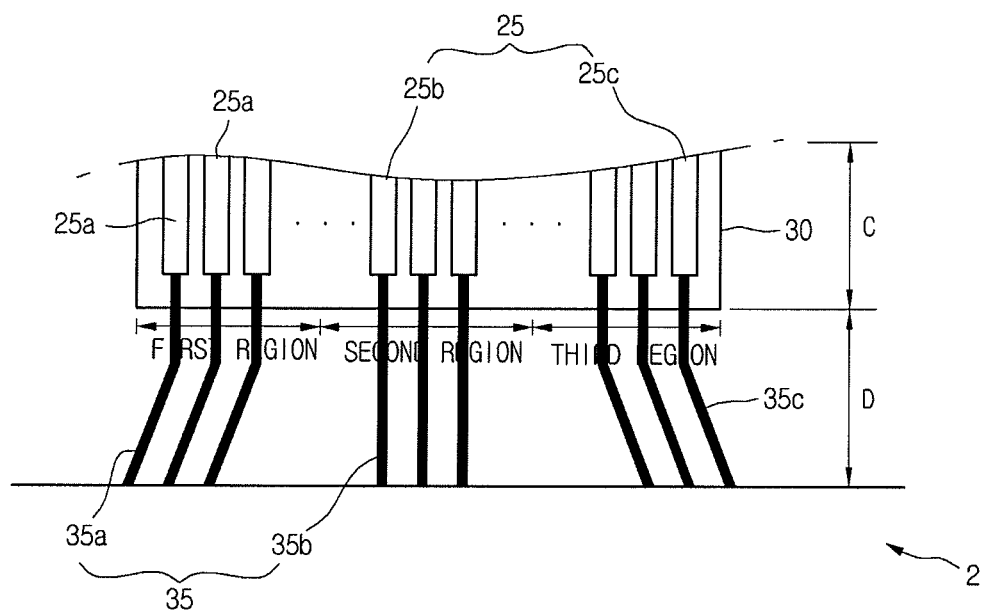
FIG. 2 is a detail view illustrating a portion A shown in FIG. 1.
Figure 3:
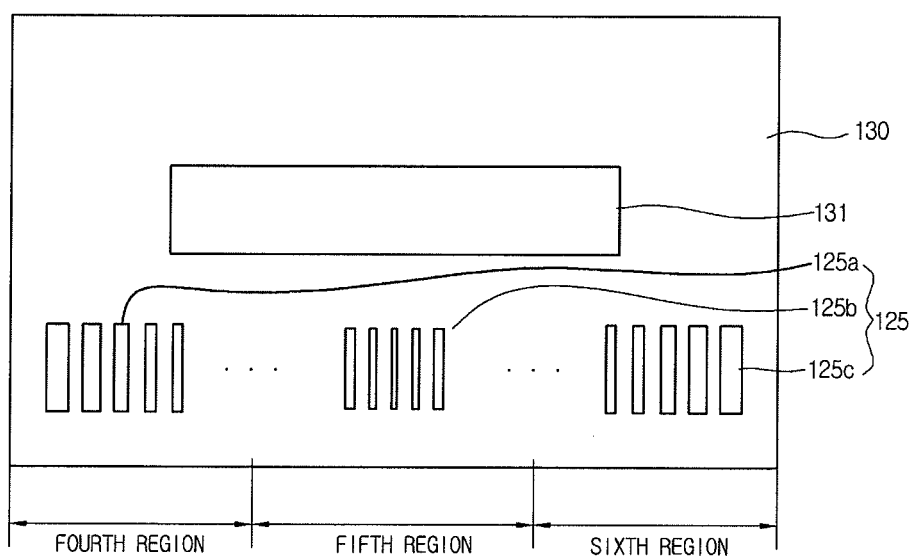
FIG. 3 is a detail view illustrating a data TCP according to an embodiment of the present invention.

FIG. 3 is a detail view illustrating a data TCP according to an embodiment of the present invention.

As illustrated in FIG. 3, a data driver IC 131 is positioned at the central portion of a data TCP 30 according to the embodiment of the present invention, and a plurality of output pads 125 are positioned at the lower side of the data TCP 30.

The lower side of the data TCP 130 is divided into fourth to sixth regions. The fourth and sixth regions indicate outer portions of the lower side of the data TCP 130, and the fifth region indicates the central portion of the lower side of the data TCP 130.

From among the plurality of output pads 125, output pads formed in the fourth region in the lower side of the data TCP 130 are referred to as first output pads 125*a*, output pads formed in the fifth region in the lower side of the data TCP 130 are referred to as second output pads 125*b*, and output pads formed in the sixth region in the lower side of the data TCP 130 are referred to as third output pads 125*c*.

A plurality of driving circuit units are mounted on the data driver IC 131, and various signals and voltages output from the plurality of driving circuit units are supplied to the plurality of output pads 125 formed in the data TCP 130.

The data driver IC 131 is mounted on the data TCP 130, and the data TCP 130 having the data driver IC 131 is positioned between a liquid crystal panel (not shown) and a data PCB.

The data TCP 130 receives a data controlling signal and a driving voltage for driving the data driver IC 131 from the data PCB to provide the same to the data driver IC 131.

The driving voltage and the controlling signal generated by the data driver IC 131 are supplied to the plurality of output pads 125.

Widths of the first and third output pads 125*a* and 125*c* that are formed in the fourth and sixth regions of the lower side of the data TCP 130 are different from those of the second output pads 125*b* formed in the fifth region of the lower side of the data TCP 130. In other words, the widths of the plurality of output pads 125 formed in the lower side of the data TCP 130 gradually decrease from the fourth region to the fifth region and gradually increase from the fifth region to the sixth region. The widths of the first and third output pads 125*a* and 125*c* formed in the fourth and sixth regions gradually decrease in the direction of the fifth region, and widths of the second output pads 125*b* formed in the fifth region gradually increase in the direction of the fourth and sixth regions.

The widths of the first and third output pads 125*a* and 125*c* formed in the fourth and sixth regions are greater than those of the second output pads 125*n* formed in the fifth region. In other words, the widths of the second output pads 125*b* are less than those of the first and third output pads 125*a* and 125c. This feature can be applied not only to the first to third output pads 125a to 125c formed in the lower side of the data TCP 130, but also output pads (not shown) formed in the lower side of the data TCP 130.

Figure 4:
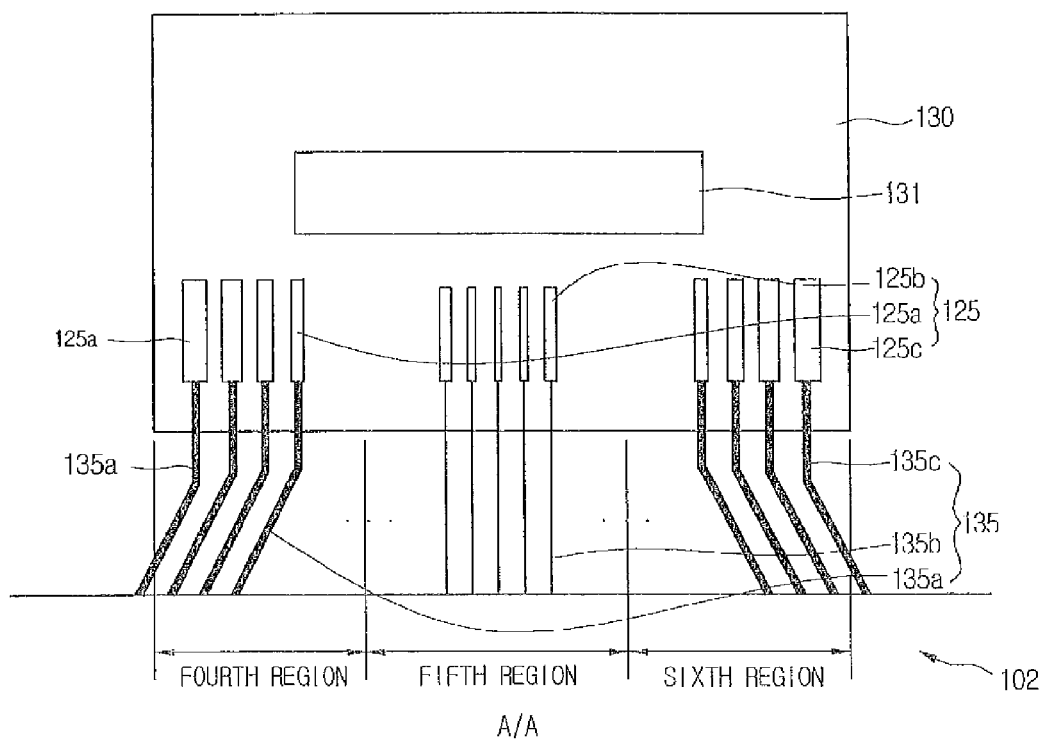
FIG. 4 is a view illustrating a part of a liquid crystal display device using the data TCP in FIG. 3.

FIG. 4 is a view illustrating a part of a liquid crystal display device using the data TCP in FIG. 3.

As illustrated in FIG. 4, the data TCP 130 is electrically connected to a liquid crystal panel 102 via a plurality of link lines 135. The plurality of link lines 135 correspond to a plurality of output pads 125 formed in the lower side of the data TOP 130 one by one. In this case, a pad unit including a plurality of connection pads, which are electrically connected to the first to third output pads 125a to 125c formed in the data TCP 130, is provided on the peripheral portion of the display region of the liquid crystal panel 102. The connection pads have the same widths as those of corresponding ones of the first to third output pads 125a to 125c.

The first output pads 125a formed in the fourth region of the lower side of the data TCP 130 are electrically connected to the first link lines 135a of the plurality of link lines 135, the second output pads 1255 formed in the fifth region of the lower side of the data TCP 130 are electrically connected to the second link lines 1355 of the plurality of link lines 135, and the third output pads 125c formed in the sixth region of the lower side of the data TCP 130 are electrically connected to the third link lines 135c of the plurality of link lines 135. In this case, the plurality of link lines 135 are provided in a link unit corresponding to the pad unit of the liquid crystal panel 102 to be electrically connected to the first to third output pads 125a to 125c.

As described above, the widths of the first and third output pads 125a and 125c formed in the fourth and sixth regions are different from those of the second output pads 125b formed in the fifth region.

Similarly, line widths of the first link lines 135a electrically connected to the first output pads 125a and the third link lines 135c electrically connected to the third output pads 125c are different from those of the second link lines electrically connected to the second output pads 125b.

In other words, the plurality of link lines 135 are configured such that the widths gradually decrease from the fourth region to the fifth region and gradually increase from the fifth region to the sixth region. The line widths of the first and third link lines 135a and 135c electrically connected to the first and third output pads 125a and 125c that are formed in the fourth and sixth regions gradually decrease in the direction of the fifth region, and the line widths of the second link lines 135b electrically connected to the second output pads 1255) that are formed in the fifth region gradually increase in the direction of the fourth and sixth regions.

In other words, when the widths of the first and third output pads 125a and 125c are different from those of the second output pads 125b, the lengths of the first link lines 135a connected to the first output pads 125a and the third link lines 135c connected to the third output pads 125c are different from the lengths of the second link lines 135b connected to the second output pads 125b.

The line widths of the first and third link lines 135a and 135c are greater than the line widths of the second link lines 135b. In other words, the line widths of the second link lines 135b are less than the line widths of the first and third link lines 135a and 135c.

Consequently, the widths of the first and third output pads 125a and 125c formed in the fourth and sixth regions of the data TCP 130 are greater than the widths of the second output pads 125b formed in the fifth region of the data TCP 130. The line widths of the first and third link lines 135a and 135c electrically connected to the first and third output pads 125a and 125c, respectively, are greater than the line widths of the second link lines 135b electrically connected to the second output pads 125b.

The lengths of the first and third link lines 135a and 135c are longer than the lengths of the second link lines 135b for a process. Since the first and third link lines 135a and 135c are formed in the outer region, rather than the second link lines 135b, the lengths of the first and third link lines 135a and 135c are longer than the lengths of the second link lines 13513.

In this case, the line resistances of the first to third link lines 135a to 135c are directly proportional to the lengths of the first to third link lines 135a to 135c, respectively, and are inversely proportional to the line widths of the first to third link lines 135a to 135c, respectively.

Since the lengths of the first and third link lines 135a and 135c are longer than the lengths of the second link lines 135b, the line resistances of the first and third link lines 135a and 135c are greater than the line resistances of the second link lines 135b.

However, since the line widths of the first and third link lines 135a and 135c are greater than the line widths of the second link lines 13513, the line resistance difference caused by the line length difference between the first to third link lines 135a to 135c can be compensated.

Therefore, in the liquid crystal display device according to the embodiment of the present invention, the line resistance differences between the first to third link lines 135a to 135c can be minimized. As the line resistance difference between the first to third link lines 135a to 135c are minimized, the distortion of the data signals applied to the data lines corresponding to the first to third link lines 135a to 135c is minimized and the image quality can be improved.

In the liquid crystal display device according to the embodiment of the present invention, the widths of the first and third output pads 125a and 125c which are positioned in the fourth and sixth regions of the data TCP 130 are different from the widths of the second output pads 125b positioned in the fifth region of the data TCP 130.

Moreover, in the liquid crystal display device according to the embodiment of the present invention, the lengths of the first link lines 135a electrically connected to the first output pads 125a and the third link lines 135c electrically connected to the third output pads 125c are different from the second link lines 135b electrically connected to the second output pads 125b.

Thus, the line resistance difference, which is caused by the length difference between the first to third link lines 135a to 135c, can be minimized.

Furthermore, in the liquid crystal display device according to the embodiment of the present invention, the line resistance difference caused by the length difference between the first to third link lines 135a to 135c can be minimized without providing any compensation patterns.

As described above, according to the liquid crystal display device of the present invention, the widths of the output pads positioned in the TCP are different from each other and the line widths of the link lines corresponding to the output pads one by one are different from each other so that the line resistance difference caused by the length difference between the link lines can be minimized.

Moreover, in the liquid crystal display of the present invention, the line resistance difference between the link lines is minimized so that the distortion of the data signals applied to the data lines corresponding to the link lines is minimized and the image quality can be improved.

As described above, according to the liquid crystal display device of the present invention, the widths of the output pads in the TCP electrically connected to the link lines connected to the data lines are different from each other and the line widths of the link lines corresponding to the output pads one by one are different from each other, so that the line resistance difference occurring due to the length difference between the link lines caused by a process can be minimized.

Furthermore, according to the liquid crystal display of the present invention, the line resistance difference of the related liquid crystal panel occurring due to the length difference between the link lines can be minimized by making the widths of the output pads different from each other and the line widths of the link lines connected to the output pads different from each other without providing any compensation patterns.

In addition, according to the liquid crystal display device of the present invention, the line resistance difference between the link lines is minimized such that the distortion of the data signals applied to the data lines corresponding to the link lines is minimized and the image quality can be improved.

Although the embodiment of the present invention has been described with respect to the data TCP for illustrative purposes, the description can be applied to the gate TCP. In other words, the widths of the output pads on the gate TCP can be different from each other and the line widths of the link lines connected to the output pads and the gate lines can be different from each other.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A liquid crystal display device comprising:
a liquid crystal panel including a display unit, in which pixels are provided in a form of a matrix, and a plurality of pad units provided at a peripheral portion in at least one side of the display unit and including a plurality of connection pads having widths different from each other;
a tape carrier package including a plurality of output pads connected to the plurality of pad units, wherein the tape carrier package is positioned between the liquid crystal panel and a printed circuit board connected to a one side of the liquid crystal panel; and
a plurality of link units including a plurality of link lines connected to the plurality of output pads,
wherein one side of the tape carrier package connected to the liquid crystal panel is divided into first to third regions in sequence,
wherein the plurality of output pads include a plurality of first output pads formed in the first region, a plurality of second output pads formed in the second region and a plurality of third output pads formed in the third region,
wherein the plurality of link lines include a plurality of first link lines connected to the plurality of first output pads, a plurality of second link lines connected to the plurality of second output pads and a plurality of third link lines connected to the plurality of third output pads,
wherein the widths of the first and third output pads formed in the first and third regions are greater than those of the second output pads formed in the second regions, the widths of the second output pads are less than those of the first and third output pads,
wherein the line widths of the first and third link lines connected to the first and third output pads are greater than those of the second link lines connected to the second output pads, the line widths of the second link lines are less than those of the first and third link lines,
wherein the plurality of output pads are electrically connected to a plurality of data lines of the display unit by the plurality of link lines,
wherein a driving voltage and a controlling signal generated by the printed circuit board are supplied to the display unit through the plurality of output pads and the plurality of link lines,
wherein the widths of the first and third output pads formed in the first and third regions gradually decrease in the direction of the second region, and widths of the second output pads formed in the second region gradually increase in the direction of the first and third regions, and
wherein the line widths of the first and third link lines connected to the first and third output pads gradually decrease in the direction of the second region, and widths of the second link lines connected to the second output pads gradually increase in the direction of the first and third region.

2. A liquid crystal display device comprising:
a tape carrier package including a plurality of output pads;
a plurality of link lines connected to the plurality of output pads; and
wherein the plurality of output pads include first to third output pad groups, the second group is a central portion of output pads, and the first group and the second group are left and right side portions of output pads to the second group, respectively,
wherein the widths of the output pads in the first and third group gradually decrease in the direction of the second group, and the widths of the second output pads gradually increase in the direction of the left and right side portions,
wherein the plurality of link lines include a first link line group connected to the first output pad group, a second link line group connected to the second output pad group and a third link line group connected to the third output pad group,
wherein the line widths of the first and third link line groups are greater than those of the second link line group, the line widths of the second link line group are less than those of the first and third link line groups.

* * * * *